United States Patent [19]

Treharne et al.

[11] 4,010,897

[45] Mar. 8, 1977

[54] METHOD AND APPARATUS FOR HOME PRODUCTION AND APPLICATION OF NITROGEN FERTILIZER

[75] Inventors: Richard W. Treharne, Xenia; Charlton K. McKibben, Dayton, both of Ohio

[73] Assignee: Charles F. Kettering Foundation, Dayton, Ohio

[22] Filed: Mar. 31, 1976

[21] Appl. No.: 672,285

[52] U.S. Cl. .................................. 239/8; 239/289; 239/318; 239/375; 239/398; 71/1; 71/53; 204/179; 423/405

[51] Int. Cl.² .................... B05B 7/30; B05B 17/04; C05C 11/00; A01C 23/04

[58] Field of Search .............. 71/1, 53, 64 C, 64 G; 423/400, 405; 204/179; 239/1, 8–10, 310, 311, 318, 340, 375, 369, 371, 398, 289; 47/1 R, DIG. 4

[56] References Cited

UNITED STATES PATENTS

| 504,898 | 9/1893 | Weidig | 239/318 X |
|---|---|---|---|
| 862,939 | 8/1907 | Richardson | 239/318 X |
| 1,138,500 | 5/1915 | Naylor | 239/318 X |
| 1,586,823 | 6/1926 | Matthews | 204/179 X |
| 1,947,994 | 2/1934 | Larson | 239/311 X |
| 2,936,548 | 5/1960 | Morrison | 423/405 X |
| 2,943,419 | 7/1960 | Harris | 71/28 X |
| 2,947,112 | 8/1960 | Morrison | 423/405 X |
| 3,260,464 | 7/1966 | Harant | 239/318 |
| 3,666,408 | 5/1972 | Grosse et al. | 204/179 X |
| 3,888,652 | 6/1975 | Yie et al. | 71/64 C X |

FOREIGN PATENTS OR APPLICATIONS

| 477,476 | 7/1915 | France | 423/405 |
| 2,336,694 | 1/1975 | Germany | 239/318 |
| 203,345 | 9/1923 | United Kingdom | 239/318 |
| 241,413 | 10/1925 | United Kingdom | 204/179 |
| 431,706 | 7/1935 | United Kingdom | 239/318 |

*Primary Examiner*—Robert S. Ward, Jr.
*Attorney, Agent, or Firm*—Biebel, French & Nauman

[57] ABSTRACT

A method and apparatus for home production and application of fixed nitrogen fertilizer uses an arc discharge process to ionize nitrogen and oxygen and form nitrogen oxides. These nitrogen oxides are injected into water supplied by a garden hose to a yard or garden. The device is compact, economical and requires no raw materials except air to produce the fixed nitrogen. The device may operate on ordinary 60 cycles, 110 volt power.

10 Claims, 2 Drawing Figures

U.S. Patent
Mar. 8, 1977
4,010,897
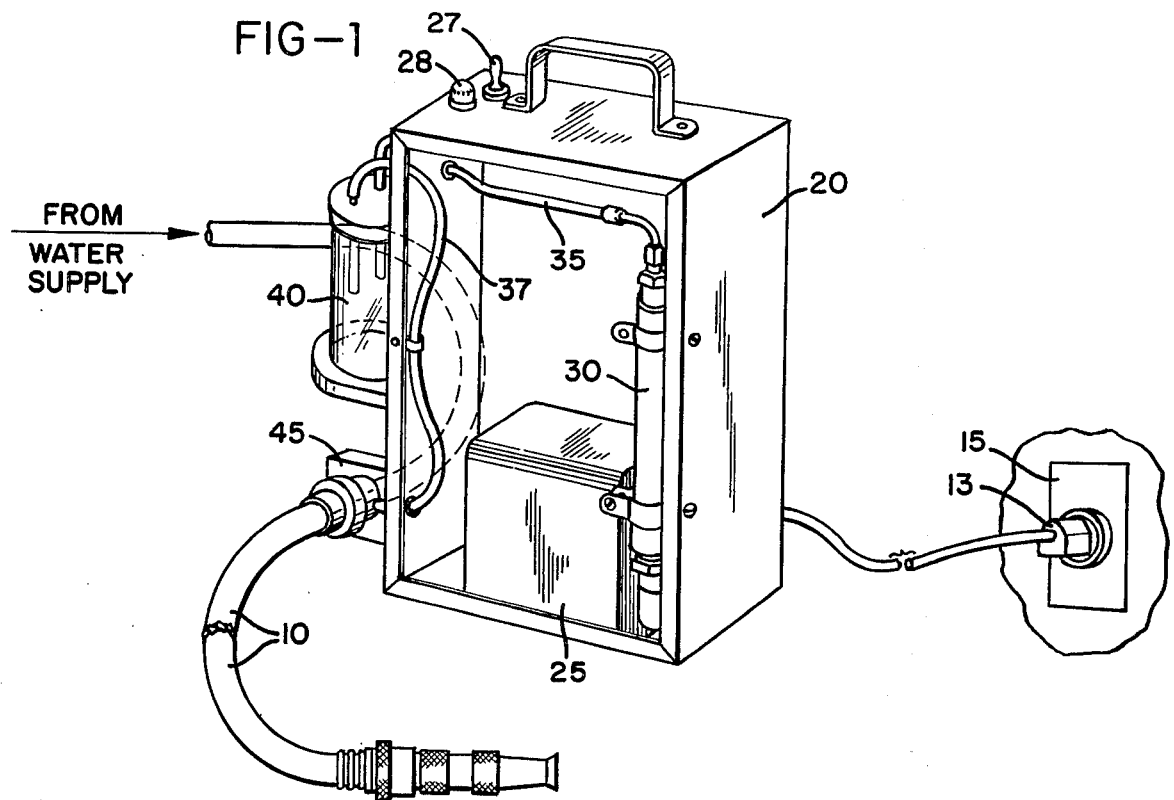
FIG-1
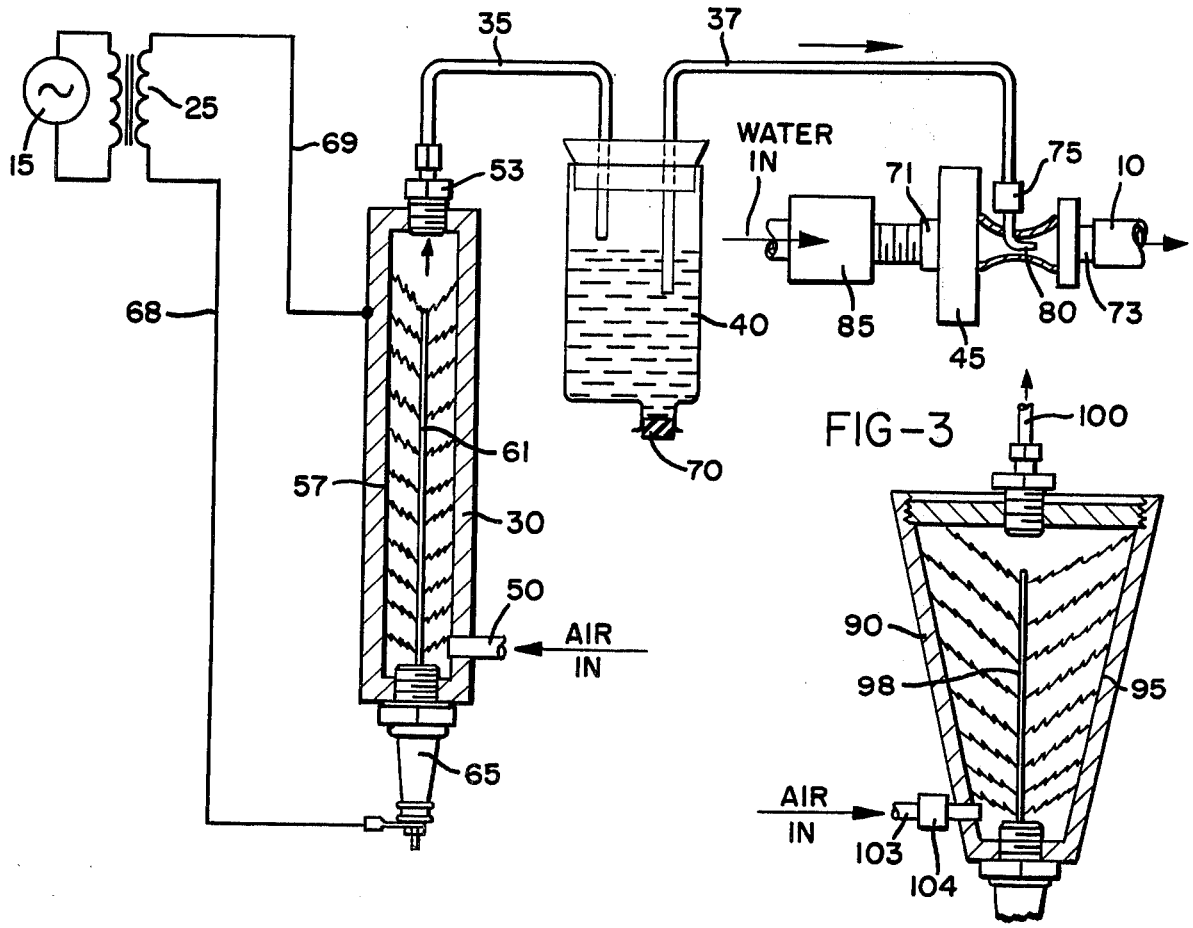
FIG-2
FIG-3

METHOD AND APPARATUS FOR HOME PRODUCTION AND APPLICATION OF NITROGEN FERTILIZER

BACKGROUND OF THE INVENTION

This invention relates to a method and apparatus for the production of nitrogen fertilizers and more particularly to a portable, home-use unit which, for example, may be attached to a garden hose for production of dilute nitric-nitrous acid fertilizer or, by the addition of lime, calcium nitrate fertilizer.

Nitrogen is an essential material in the production of fertilizers. While it is the major component of the atmosphere (79 percent in dry air), nitrogen can be incorporated into most living systems only in the "fixed" form and nitrogen is less abundant in its fixed form. For gardening and yard maintenance it is desirable to supplement the natural sources of fixed nitrogen with chemical fertilizers. Typically, chemical fertilizers contain nitrogen which is fixed by industrial methods in which nitrogen is combined with hydrogen to form ammonia.

The principle industrial method for producing ammonia is the Haber process. In the Haber process, one molecule of nitrogen and three molecules of hydrogen combine at elevated temperature and pressure in the presence of a catalyst to form two molecules of ammonia. The hydrogen utilized in the Haber process is obtained primarily from natural gas and liquid hydrocarbons. As long as there is a ready and inexpensive supply of hydrogen, the Haber process is unequaled in cost and efficiency for producing fixed nitrogen fertilizers.

However, because of the energy crisis the source of supply of hydrogen has decreased, and there has been a concomittant rise in the price. The demand for fixed nitrogen continues to grow, however, due to world population increases and the introduction of nitrogeneous fertilizers in the underdeveloped regions of the world. Thus it would appear likely that the cost of fixed nitrogen will continue to increase.

Accordingly, an investigation has begun into nitrogen fertilizer production methods other than the Haber process. See, for example, Safrany, "Nitrogen Fixation", *Scientific America*, Vol. 231, No. 4, pp. 64–80 (1974), wherein the following possible alternatives are discussed: biological fixation, metallo-organic, thermal activation, and low temperature ionization.

Principally, these alternatives strive to produce various nitrogen oxides, which with water addition will form nitric acid ($HNO_3$). That is depending on conditions, the reaction of nitrogen gas and oxygen gas will form one or more of the following nitrogen oxides: NO, $N_2O_3$, $NO_2$ or $N_2O_4$. Safrany states that it is easiest to discuss the reaction as producing nitric oxide ($N_2 + O_2 \rightarrow 2NO$). But it should be realized that nitric oxide (NO) readily combines with oxygen at room temperature in an exothermic reaction to form nitrogen dioxide ($NO_2$). Thus, the reaction $N_2 + 2O_2 \rightarrow 2NO_2$ can be said to be favored since nitrogen dioxide has the lowest heat of formation.

In any event, for production of the nitrogen oxides, Safrany finds low-temperature ionization to be the most attractive alternative. He states:

"Low-temperature ionization has the significant advantage that in principle all the molecules of the gas can be ionized or excited. The activation can be accomplished by subjecting the air to an electrcal potential of a few thousand volts, so that a low-temperature discharge is initiated, or by exposing air to an intense flux of ionizing radiation inside a nuclear reactor. In either case the gas molecules are bombarded by fast-moving ions and the collisions are inelastic. The resulting cascade of reactions can produce a substantial yield of nitrogen oxides.

As in all endoergic processes, the telling factor in calculating the feasibility of low-temperature activation is the cost of energy. If the source of energy is electricity, its cost would seem to forbid fixation by air activation as a commercial enterprise. The "chemonuclear" technique, on the other hand, utilizes a remarkably cheap form of energy: the kinetic energy of the nuclear fragments produced by the fission of a uranium nucleus."

As can be seen, even within the broad category of low-temperature ionization, Safrany prefers the chemonuclear approach because of the economics involved. The rejected alternative is use of an electrical arc discharge process.

The basics of using an electrical arc discharge for production of nitrogen oxides are well known. See, for example, Ephram, *Inorganic Chemistry*, Fifth Edition-Revised, 1949, pp. 680–704. However, the art has also long recognized that difficulties exist with the arc discharge process. Thus in Ephram at page 683 it is stated:

"The percentage of nitric oxide in the equilibrium $N_2 + O_2 \rightleftharpoons 2NO$ is:

| Temperature | 1500° | 2000° | 2500° | 2900° | 3200° | 4200° T. |
|---|---|---|---|---|---|---|
| Per cent | 0.1 | 0.61 | 1.79 | 3.20 | 4.43 | 10 |

In order to obtain a fair yield an exceptionally high temperature must be employed; 4200° T. corresponds approximately to aht attained in the electric arc, and a favourable yield can then be obtained. At this temperature, however, not only the establishment of the equilibrium, but also the back decomposition, is very rapid, and it is necessary to bring the nitric oxide formed to a region of lower temperature as quickly as possible to avoid a great part of it being lost. This is carried out by having the arc suitably constructed, so that either it is spread out by an electro-magnet into a thin disc of flame, through which the N—O mixture (air) is blown, or the arc is kept in motion in the form of a sinuous, narrow, spiral band, or is forced into a water-cooled iron tube. In this way, on a laboratory scale, up to 8 percent of the mixture has been converted to a nitric oxide, and in technical operations, up to 2.5 percent. It is not only the thermal effect of the arc which is responsible for the formation of nitric oxide; under the influence of strong electric fields (silent discharges), oxygen and nitrogen are decomposed into atoms which can then combine to form nitric oxide. This process must also play a part in the arc process."

As can be seen from the above, while a process of low temperature ionization for the production of fixed nitrogen is known, the economic feasibility of electric arc activation of air as a means of fixation has been considered doubtful. The total cost per pound of using electrical low temperature ionization for nitrogen fixation is indicated by the Safrany article to be 15 times the cost of chemonuclear low temperature ionization and 2½ times the cost of the Haber process.

Such methods of production are of course not feasible for a home-use unit which fixes nitrogen and injects it into the water line supplying moisture to the yard or garden. Production of nitrogen fertilizer by a unit which automatically adds the fertilizer to the water flowing through a garden hose would eliminate the distribution and transportation costs which are responsible for a large portion of the delivery cost of industrially produced nitrate fertilizer. Additionally, if the arc discharge process were used, nitrogen oxides would be formed from air and the home owner would not need to keep a supply of fertilizer on hand. Also, fertilization of the yard or garden could be accomplished without the time consuming spreading required when dry fertilizers are used.

Thus a need exists for a practical, efficient, economical source of nitrogen fertilizer for home use, particularly one capable of producing nitrogen oxides and injecting them into a water line supplying moisture to the yard or garden of a home.

SUMMARY OF THE INVENTION

A device and method for producing nitrogen oxides by arc discharge and injecting them into a water line supplying moisture to the yard or garden of a home uses power from an electrical outlet as a source of alternating electric power. A transformer means for supplying a high voltage potential is mounted in a cabinet and is connected to the source of alternating electric power. An arc discharge chamber, having an air intake opening and an exhaust opening, is mounted in the cabinet. The discharge chamber includes a chamber surface which defines a first electrode, and a second electrode positioned centerally in the chamber. A means for applying the high voltage potential to the first and second electrodes is provided such that ionization of nitrogen and oxygen occurs in the chamber and nitrogen oxides are formed. A transport means communicates with the exhaust opening of the arc discharge chamber to remove gases including the nitrogen oxides from the chamber. A water fitting means is mounted on the exterior of the cabinet and has input and output openings which connect between a source of water, such as a water faucet, and the water line, typically a garden hose. A check valve means is mounted in the water fitting means for inserting the nitrogen oxides into the water flowing through the fitting means.

A Jacob's Ladder arcing may be effected by providing a conical arc discharge chamber. Successive upward moving sparks will tend to move the gas in the chamber toward an exhaust opening in the upper portion of the chamber. Alternatively, a cylindrical arc discharge chamber may be used and suction created by the water flow through the water fitting relied upon to draw the gases through the device. A transparent container in the transport means may be mounted on the exterior of the cabinet to provide a visual indication that nitrogen oxides are being produced in the arc discharge chamber. If desired an alkaline substance such as lime or potassium phosphate may be added to solution to be applied to the yard or garden. The fixed nitrogen solution may typically be sprayed on the yard or garden of a home by means of a garden hose.

The pumping action of the conical discharge chamber may be utilized to form nitrogen fertilizer in a container. A container of aqueous solution is provided and the transport means supplies the nitrogen oxide gases to the solution to form the desired fixed nitrogen solution.

Accordingly, it is an object of the present invention to provide a home-use device and method for producing nitrogen oxides and injecting them into a water line; to provide such a device and method which use the arc discharge principal; and, to provide such a device and method which are simple and economical.

Other objects and advantages of the invention will be apparent from the following description, the accompanying drawings, and the appended claims.

BRIEF DESCRIPTION OF THE DRAWINGS

FIG. 1 is a perspective view of the present invention with the front panel of the cabinet removed;

FIG. 2 is a diagrammatic representation of apparatus used in the present invention; and FIG. 3 is a sectional view of an arc discharge chamber of an alternative embodiment of the present invention.

DETAILED DESCRIPTION OF THE INVENTION

FIG. 1 is a perspective view showing a device embodying the present invention which is capable of producing nitrogen oxides by an arc discharge process and injecting them into a line supplying moisture to the yard or garden of a home. Typically, sprinkling of a yard or garden is accomplished by a home owner with a garden hose 10 which is connected to an exterior faucet (not shown) on the side of the house. The present invention contemplates a device which is simply coupled into the garden hose water supply and which produces fixed nitrogen and adds it to the water sprinkled on the yard or garden. No raw materials other than air are needed for producing the fixed nitrogen and the device may operate on house current or a rechargeable battery power source. A three-prong plug 13 may be plugged into an outside electric outlet 15 which provides the source of alternating electric power needed for the device. A cabinet 20, here shown with the front panel removed, is grounded to prevent an electrical shock to a user and houses a transformer means 25. An ON-OFF switch 27 and pilot light 28 are mounted on the top of cabinet 20. The transformer means 25 is connected to the source of alternating electric power 15 and supplies a high voltage potential. An arc discharge chamber 30 receives the high voltage alternating potential from the transformer and produces nitrogen oxides by ionizing nitrogen and oxygen in the air within the chamber through electric arc discharge. A transport means including tubes 35 and 37 and transparent container 40 transport the gases from chamber 30 to a water fitting means 45. The nitrogen oxides injected into the water line 10 will form a solution which, when applied to a yard or garden, provides a source of fixed nitrogen. If desired an alkaline substance may also be inserted into line 10, as discussed below, to neutralize the weak nitrous and nitric acids in the solution.

Referring now to FIG. 2, portions of the present invention are shown in greater detail. A source of alternating electric power 15 may typically be the 110 volt, 60 cycle power available from a home electric outlet. Step-up transformer 25 is connected to source 15 and supplies a high voltage alternating potential of approximately 5,000 volts or more. Arc discharge chamber 30 has an air intake opening 50 and an exhaust opening 53 and includes a chamber surface 57 which defines a first electrode. A second electrode 61 is positioned centrally in the chamber. The chamber shown in FIG. 2 is generally cylindrical in shape and approximately ½ inch inside diameter. The spark gap, therefore, between electrodes 57 and 61 is approximately ¼ inch and is uniform along the length of the chamber. Electrode 61 is held by mounting 65 and is of the type generally used for a gas furnace spark igniter. Conductors 68 and 69 provide a means for applying the high voltage alternating potential from transformer 25 to the first and second electrodes 57 and 61 to cause arcing between the electrodes. The nitrogen and oxygen in the air in chamber 30 will be ionized as a result of this arcing and will cimbine to form nitrogen oxides.

A transport means includes tubes 35 and 37 and transparent container 40. As shown in FIG. 1, container 40 is mounted exterior to the cabinet 20. Since several nitrogen oxides are colored, container 40 provides a visual indication that arc discharge chamber 30 is fuctioning to produce nitrogen oxides. Nitrogen dioxide, especially desired because of the low energy requirements for its formation, is a dark reddish-brown gas whose presence in container 40 is easily detected. As a safety precaution, flapper valve 70 is provided in an opening in the bottom of container 40. If water fitting means 45 should function improperly and permit water to back up through tube 37 into chamber 40, valve 70 will be dislodged and thus prevent water from reaching discharge chamber 30.

Water fitting means 45 has an input opening 71 and an output opening 73. The input opening 71 may communicate with a source of water and the output opening 73 is connected to the water line, such as hose 10, which distributes the fertilizer solution. A check valve means 75 in the water fitting means 45 communicates with the transport means and inserts the nitrogen oxides into the water flowing through the fitting means. The check valve means 75 is provided to insure that no water flows into tube 37 from fitting means 45. Gases in line 37 are drawn into fitting 45 by the pressure differential caused by the Venturi action of water flowing past tube 80. This Venturi action may be facilitated by narrowing the water passage, as shown, to increase the flow velocity of the fluid.

If it is desired to apply a neutral solution to the yard or garden, an alkaline substance may be inserted into the water in the water line. Lime or limestone may be added into the water by unit 85 which may consist of a chamber containing a number of lime or limestone pellets which gradually dissolve as water flows through the chamber. It should of course be understood that unit 85 may also be placed downstream from fitting 45, if desired. Other alkaline substances, such as potassium phosphate, $K_3(PO_4)$, may also be used and a potassium nitrate mixture will be produced. The phosphate in this mixture is also beneficial to the lawn or garden. It should be noted that the movement of the gases through the device is the result of the suction caused by the water flowing through fitting 45 and drawing the gases into the water stream.

Referring now to FIG. 3, an alternative design for an arc discharge chamber is shown. Chamber 90 is generally conical in shape such that the electrode surface 95 and electrode 98 define a spark gap which increases toward the upper portion of the gap. Exhaust opening 100 and intake opening 103 are positioned so that the Jacob's Ladder arcing effect resulting from the electrode configuration tends to draw air into the chamber and move the gases in the chamber toward the exhaust opening. A check valve 104 may be provided at opening 103 to insure that all air flow is into chamber 90. This pumping action may be used to supplement or replace the siphoning action of fitting 45 shown in FIG. 2. Alternatively, it may be desired to produce a fixed nitrogen solution in a bucket or other container. If a discharge chamber such as shown in FIG. 3 is used in the device, tube 37 (FIG. 1) may be disconnected from the water fitting 45 and placed in a bucket of water or alkaline solution. The pumping action of chamber 90 will cause the nitrogen oxide gases to be bubbled through the solution in the bucket, thus producing a fixed nitrogen solution.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. A device for producing nitrogen oxides by an arc discharge process and for injecting them into a water line supplying moisture to the yard or garden of a home, comprising:

a cabinet, a source of electric power, transformer means in said cabinet, connected to said source of electric power, for supplying a high voltage potential, an arc discharge chamber, having an air intake opening and an exhaust opening, mounted in said cabinet, and including a chamber surface defining a first electrode, and a second electrode positioned centrally in said chamber, means for applying said high voltage potential to said first and second electrodes to cause arcing between said electrodes whereby nitrogen and oxygen in said chamber are ionized and nitrogen oxides are formed, transport means communicating with said exhaust opening of said arc discharge chamber for removing gases including said nitrogen oxides from said chamber, water fitting means mounted on the exterior of said cabinet and having input and output openings, said input opening communicating with a source of water and said output opening communicating with the water line distributing the fertilizer solution, and check valve means in said water fitting means for communicating with said transport means and for inserting said nitrogen oxides into the water flowing through said fitting means whereby a solution containing fixed nitrogen may be supplied to the yard or garden of a home.

2. The device of claim 1 in which said chamber surface is cylindrical.

3. The device of claim 1 in which said chamber surface is cone-shaped with said exhaust opening at the wider end of said chamber and in which a Jacob's Ladder arcing effect is created which tends to move the gases in said chamber toward said exhaust opening.

4. The device of claim 1 in which said transport means includes a transparent container mounted on the exterior of said cabinet through which said gases from said arc discharge chamber pass, whereby a visual indication is provided when nitrogen oxides are being produced in said arc discharge chamber.

5. A method of home production and application of a fixed nitrogen fertilizer solution to the yard or garden of a home comprising the steps of:

applying power from an electrical outlet to electrodes mounted in an arc discharge chamber such that a portion of the oxygen and nitrogen in the air in the chamber is ionized and nitrogen oxides are formed, transporting the gases in said chamber to a fixture connected between a garden hose and a water faucet and inserting said gases into the water as it flows from the faucet into the hose such that a fixed nitrogen solution is formed, and spraying said fixed nitrogen solution on the yard or garden with said garden hose.

6. The method of claim 5 wherein said step of transporting further includes the step of transporting said gases including nitrogen oxides through a transparent chamber whereby the formation of said nitrogen oxides is visually indicated.

7. The method of claim 5 further including the step of adding an alkaline substance to said water whereby said fixed nitrogen solution is neutral.

8. The method of claim 7 wherein said step of adding an alkaline substance includes the step of adding lime to said water.

9. The method of claim 7 wherein said step of adding an alkaline substance includes the step of adding potassium phosphate to said water.

10. A device for producing nitrogen oxides by an arc discharge process and for adding them into a container of aqueous solution for home use, comprising:

a cabinet, a source of electric power, transformer means in said cabinet, connected to said source of electric power, for supplying a high voltage potential, an arc discharge chamber, having an air intake opening and an exhaust opening, mounted in said cabinet, and including a chamber surface defining a first electrode, and a second electrode positioned centrally in said chamber, said chamber surface being cone shaped with said exhaust opening at the wider end of said chamber such that a Jacob's Ladder arcing effect is created which tends to move the gases in said chamber toward said exhaust opening, means for applying said high voltage potential to said first and second electrodes to cause arcing between said electrodes whereby nitrogen and oxygen in said chamber are ionized and nitrogen oxides are formed, a container of aqueous solution, and transport means communicating with said exhaust opening of said arc discharge chamber for removing gases including said nitrogen oxides from said chamber and transporting said gases to said container where said gases are inserted into the aqueous solution in said container whereby a solution containing fixed nitrogen is formed.

* * * * *